(12) United States Patent
Kumura

(10) Patent No.: US 7,299,460 B2
(45) Date of Patent: Nov. 20, 2007

(54) METHOD AND COMPUTER PROGRAM FOR CONVERTING AN ASSEMBLY LANGUAGE PROGRAM FOR ONE PROCESSOR TO ANOTHER

(75) Inventor: Takahiro Kumura, Tokyo (JP)

(73) Assignee: NEC Corporation (JP)

( * ) Notice: Subject to any disclaimer, the term of this patent is extended or adjusted under 35 U.S.C. 154(b) by 608 days.

(21) Appl. No.: 10/446,698

(22) Filed: May 29, 2003

(65) Prior Publication Data
US 2004/0243983 A1 Dec. 2, 2004

(51) Int. Cl.
*G06F 9/45* (2006.01)

(52) U.S. Cl. .................... 717/137; 717/136; 717/138; 717/139

(58) Field of Classification Search ......... 717/136–139
See application file for complete search history.

(56) References Cited

U.S. PATENT DOCUMENTS

| | | | | |
|---|---|---|---|---|
| 3,976,978 | A * | 8/1976 | Patterson et al. | 711/208 |
| 5,560,013 | A * | 9/1996 | Scalzi et al. | 717/138 |
| 5,768,593 | A * | 6/1998 | Walters et al. | 717/141 |
| 5,991,531 | A * | 11/1999 | Song et al. | 703/26 |
| 5,991,870 | A * | 11/1999 | Koumura et al. | 712/208 |
| 6,360,194 | B1 * | 3/2002 | Egolf | 703/26 |
| 6,446,034 | B1 * | 9/2002 | Egolf | 703/27 |
| 6,981,132 | B2 * | 12/2005 | Christie et al. | 712/226 |
| 7,028,292 | B1 * | 4/2006 | Yokota et al. | 717/139 |

FOREIGN PATENT DOCUMENTS

| | | |
|---|---|---|
| JP | 03-241432 | 10/1991 |
| JP | 07-210397 A | 8/1995 |
| JP | 08-179953 A | 7/1996 |

OTHER PUBLICATIONS

Kemal Ebcioglu, et al., "Dynamic Binary Translation and Optimization," IEEE Transactions on Computers, vol. 50, No. 6, pp. 529-548 (Jun. 2001).
Open Source DAISY (Dynamically Architected Instruction Set from Yorktown), IBM Internet home page (http://oss.software.ibm.com/developerworks/opensource/daisy/).
Anton Chernoff, et al., "FX!32 A Profile-Directed Binary Translator," IEEE Micro, vol. 18, No. 2, pp. 56-64 (Mar./Apr. 1998).

(Continued)

*Primary Examiner*—Meng-Al T. An
*Assistant Examiner*—Jason Mitchell
(74) *Attorney, Agent, or Firm*—Dickstein, Shapiro, LLP.

(57) ABSTRACT

Disclosed is a technology of converting a first assembly language program implementable on a first processor to a second assembly language program implementable on another processor. The two assembly language programs are described using same instructions. A unique address in the first assembly language program is assigned to a first number of bytes, and a unique address in the second assembly language program is assigned to a second number of byte numbers. The first number is larger than the second number. The first assembly language program is read from a storage. Thereafter, one or more address descriptions of the first assembly language program are translated to another one or more address descriptions using a ratio of the first number to the second number so that the first assembly language program is implementable on the second processor, wherein the ratio is 2 or a positive integer more than 2.

4 Claims, 12 Drawing Sheets

OTHER PUBLICATIONS

Alexander Klaiber, et al., "The Technology Behind Crusoe™ Processors," Transmeta Corporation, pp. 1-18 (Jan. 2000).

Dynamite Dynamic Binary Translation, Transitive Technologies Ltd., 2001 (http://www.transives.com).

M.F. Smith, et al., "Automatic Assembler Source Translation from the Z80 to the MC6809," IEEE Micro, pp. 3-9, (Apr. 1984).

TMS320C5x to TMS320C54x Translation Utility, Literature No. BPRA075, published by Texas Instrument Europe (Feb. 1998).

* cited by examiner

FIG. 1

ORIGINAL PROGRAM
↓

14 — If a character string to which an address is assigned matches predetermined conditions, the character string is multiplied by 1/L where L is a ratio of byte numbers assigned to a unique address in an original processor to byte numbers assigned to a unique address in a target processor

16 — A character string and/or a numerical value, which indicates an address for data-read or data-write with respect to memory, is multiplied by L

18 — If there is an instruction for reading or writing a value using an address stored in a general purpose register with respect to memory, new instructions for multiplying contents of registers by L or 1/L are inserted

20 — Deleting redundant instructions added in step 18

↓
CONVERTED PROGRAM

10 STORAGE    12 COMPUTER

FIG. 2
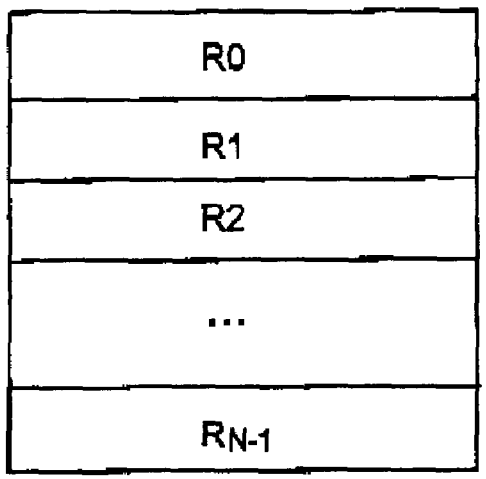
GENERAL PURPOSE
REGISTERS R0-$R_{N-1}$
USED BY PROCESSOR FOR
TEMPORARILY STORING DATA OR
COMPUTATION RESULTS, OR IN
SOME TIMES USED FOR STORING
ADDRESSES INDICATING
LOCATIONS OF MEMORY (VIZ.,
MEMORY SPACE OTHER THAN
REGISTERS)
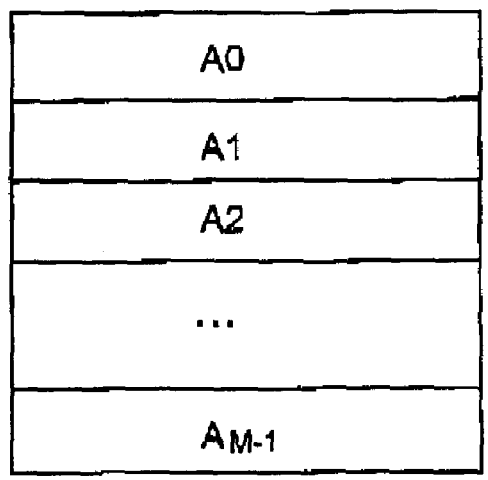
ADDRESS REGISTERS
A0-$A_{M-1}$
FOR STORING ADDRESSES
INDICATING LOCATIONS OF
MEMORY (OTHER THAN
REGISTERS)

FIG. 3

| SYMBOLS DESCRIBED IN COMMENTS AND REFERRED TO BY PROGRAM CONVERTER | NOTES | EXAMPLES OF INSTRUCTIONS |
|---|---|---|
| LDST0 | Read data from address described by character string and/or numerical value, or write data into such an address | R0=*[label+K], *[label+K]=R0 |
| LDST1 | Read data from address indicated by contents of a general purpose register, or write data into such an address | R1=*[R4], *[R4]=R1 |
| LDST2 | Read data from address which is the sum of address described by character string and/or numerical value and value stored in a general purpose register, or write data into such an address | R2=*[R4+K], *[R4+K]=*R2 |
| LDST3 | Read data from address which is the sum of two general purpose registers | R3=*[R4+R5], *[R4+R5]=R3 |
| MV0 | move value described by character string and/or numerical value to a general purpose register | R0=K |
| ADD0 | Add instruction using a general purpose register | R0=R1+R2 |
| ADD1 | Transfer the sum of value stored in a general purpose register and value read from memory to a general purpose register | R0=R1+*[address] |
| SHFT0 | Shift instruction using a general purpose register | R0=R1>>K, R0=R1<<K |

FIG. 4

ORIINAL PROGAM

```
1: /* Original program (load and store instructions use word addresses)* /
2:
3: /* mv0: move address label1 to R4 */
4:      R4=label1;
5: /* mv1: move 4 to R5 */
6:      R5=4;
7: /* ldst0: read value from memory using address which is sum of label1 and 4 */
8:      R0=*[label1+4];
9: /* ldst1: read value from memory using address stored in R4 */
10:     R1=*[R4];
11: /* ldst2: read value from memory using address which is sum of R4 and 4 */
12:     R2=*[R4+4];
13: /* ldst3: read value from memory using address which is sum of R4 and R5 */
14:     R3=*[R4+R5];
15: /* add0: move sum of R4 and R5 to R4 */
16:     R4=R4+R5;
17: /* add1: move sum of R5 and R3 to R5 */
18:     R5=R5+R3;
```

NOTES: Rn (n=0, 1, ..., N-1) indicates a general purpose register

FIG. 5

PROGAM AFTER PROCESSED AT STEP 14

1: /* Program after only character string indicative of address has been converted */
2:
3: /* mv0: move address label1 to R4 */
4:     R4=(label1/2);
5: /* mv1: move 4 to R5 */
6:     R5=4;
7: /* ldst0: read value from memory using address which is sum of label1 and 4 */
8:     R0=*[(label1/2)+4];
9: /* ldst1: read value from memory using address stored in R4 */
10:    R1=*[R4];
11: /* ldst2: read value from memory using address which is sum of R4 and 4 */
12:    R2=*[R4+4];
13: /* ldst3: read value from memory using address which is sum of R4 and R5 */
14:    R3=*[R4+R5];
15: /* add0: move sum of R4 and R5 to R4 */
16:    R4=R4+R5;
17: /* add1: move sum of R5 and R3 to R5 */
18:    R5=R5+R3;

FIG. 6

PROGRAM AFTER PROCESSED AT STEPS 16 AND 18

```
1:  /* Program after steps 16 & 18 (load and store instructions use byte address)*/
2:
3:      R4=(label1/2);            /* mv0 */
4:      R5=4;                     /* mv1 */
5:      R0=*[((label1/2)+4)*2];   /* ldst0 */
6:          R4=R4+R4;             /* convert R4 to byte address */
7:      R1=*[R4];                 /* ldst1 */
8:          R4=R4>>1;             /* convert R4 to word address */
9:          R4=R4+R4;             /* convert R4 to byte address */
10:     R2=*[R4+ (4)*2];          /* ldst2 */
11:         R4=R4>>1              /* convert R4 to word address */
12:         R4=R4+R4;             /* convert R5 to byte address */
13:         R5=R5+R5;             /* convert R5 to byte address */
14:     R3=*[R4+R5];              /* ldst3 */
15:         R4=R4>>1;             /* convert R4 to word address */
16:         R5=R5>>1;             /* convert R5 to word address */
17:     R4=R4+R5;                 /* add0 */
18:     R5=R5+R3;                 /* add1 */
```

FIG. 7

CONVERTED PROGRAM

```
1:  /* Converted program (load and store instructions use byte address)*/
2:
3:      R4=(label1/2);              /* mv0 */
4:      R5=4;                       /*mv1 */
5:      R0=*[((label1/2)+4)*2];     /* ldst0 */
6:         R4=R4+R4;                /* convert R4 to byte address */
7:      R1=*[R4];                   /* ldst1 */
8:      R2=*[R4+ (4)*2];            /* ldst2 */
9:         R5=R5+R5;                /* convert R5 to byte address */
10:     R3=*[R4+R5];                /* ldst3 */
11:        R4=R4>>1;                /* convert R4 to word address */
12:        R5=R5>>1;                /* convert R5 to word address */
13:     R4=R4+R5;                   /* add0 */
14:     R5=R5+R3;                   /* add1 */
```

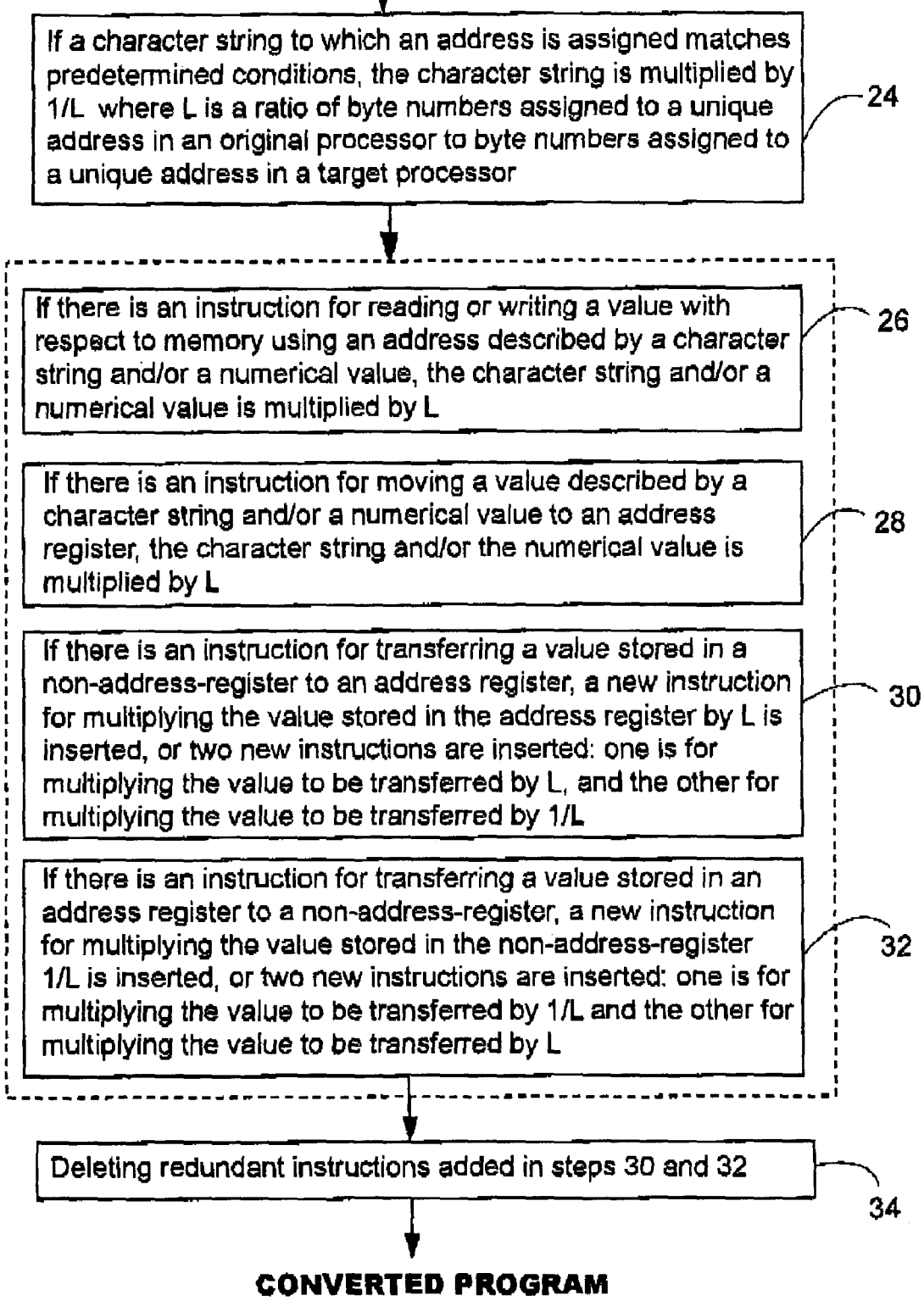

FIG. 9

| SYMBOLS DESCRIBED IN COMMENTS AND REFERRED TO BY PROGRAM CONVERTER | NOTES | EXAMPLES OF INSTRUCTIONS |
|---|---|---|
| LDST0 | Read data from address described by character string and/or numerical value, or write data into such an address | R0=*[label+K], *[label+K]=R0 |
| LDST4 | Read data from address indicated by an address register, or write data into such an address | R1=*[A0], *[A0]=R1 |
| LDST5 | Read data from address which is the sum of address described by character string and/or numerical value and value stored in an address register, or write data into such an address | R2=*[A0+K], *[A0+K]=*R2 |
| LDST6 | Read data from address which is the sum of two address registers, or write data into such an address | R3=*[A0+RA1], *[A0+A1]=R3 |
| MV0 | Move value described by character string and/or numerical value to a general purpose register | R0=K |
| MV1 | Move value described by character string and/or numerical value to an address register | A0=K |
| MV2 | Move value from a non-address register to an address register | A0=R0 |
| MV3 | Move value from an address register to a non-address register | R0=A0 |
| ADD0 | Add instruction using a general purpose register | R0=R2+R2 |
| ADD1 | Move value, which is the sum of value stored in a general purpose register and value read from memory, to a general purpose register | R0=R1+*[address] |
| ADD2 | Add instruction using an address register | A0=A1+A2 |
| SHFT0 | Shift instruction using a general purpose register | R0=R1>>K, R0=R1<<K |

FIG. 10

ORIINAL PROGAM

```
1:  /* Original program (load and store instructions use word address) */
2:
3:  /* mv0: move address label1 to R4 */
4:      R4=label1;
5:  /* mv0: move 4 to R5 */
6:      R5=4;
7:  /* mv1: move address label1 to A0 */
8:      A0=label1;
9:  /* mv1: move 4 to A1 */
10:     A1=4;
11: /* mv2: move R4 to A0 */
12:     A0=R4;
13: /* mv2: move R5 to A1 */
14:     A1=R5;
15: /* ldst0: read value from memory using address which is sum of label1 and 4 */
16:     R0=*[label1+4];
17: /* ldst4: read value from memory using address stored in A0 */
18:     R1=*[A0];
19: /* lsdt5: read value from memory using address which is sum of A0 and 4 */
20:     R2=*[A0+4];
21: /* ldst6: read value from memory using address which is sum of A0 and A1 */
22:     R3=*[A0+A1];
23: /* add0: move sum of R4 and R5 to R4 */
24:     R4=R4+R5;
25: /* add0: move sum of R5 and R3 to R5 */
26:     R5=R5+R3;
27: /* add1: move sum of R5 and value read from memory to R5 */
28:     R5=R5+*[label1+4];
29: /* mv3: move A0 to R4 */
30:     R4=A0;
31: /* mv3: move A1 to R5 */
32:     R5=A1;
```

NOTES: Rn (n=0, 1, ..., N-1) indicates a general purpose register
Am (m=0, 1, ..., M-1) indicates an address register

FIG. 11

PROGRAM AFTER PROCESSED
AT STEPS 26, 28, 30, 32

1: /* Program after converting only character string indicative of address */
2:
3: /* mv0: move address label1 to R4 */
4:     R4=(label1/2);
5: /* mv0: move 4 to R5 */
6:     R5=4;
7: /* mv1: move address label1 to A0 */
8:     A0=(label1/2);
9: /* mv1: move 4 to A1 */
10:    A1=4;
11: /* mv2: move R4 to A0 */
12:    A0=R4;
13: /* mv2: move R5 to A1 */
14:    A1=R5;
15: /* ldst0: read value from memory using address which is sum of label1 and 4 */
16:    R0=*[(label1/2)+4];
17: /* ldst4: read value from memory using address stored in A0 */
18:    R1=*[A0];
19: /* ldst5: read value from memory using address which is sum of A0 and 4 */
20:    R2=*[A0+4];
21: /* ldst6: read value from memory using address which is sum of A0 and A1 */
22:    R3=*[A0+A1];
23: /* add0: move sum of R4 and R5 to R4 */
24:    R4=R4+R5;
25: /* add0: move sum of R5 and R3 to R5 */
26:    R5=R5+R3;
27: /* add1: move sum of R5 and value read from memory to R5 */
28:    R5=R5+*[(label1/2)+4];
29: /* mv3: move A0 to R4 */
30:    R4=A0;
31: /* mv3: move A1 to R5 */
32:    R5=A1;

FIG. 12

CONVERTED PROGRAM

```
1:  /* Converted Program (load and store instructions use byte address) */
2:
3:      R4=(label1/2);              /* mv0 */
4:      R5=4;                       /* mv0 */
5:      A0=((label1/2)*2);          /* mv1 */
6:      A1=(4)*2;                   /* mv1 */
7:      A0=R4;                      /* mv2 */
8:          A0=A0+A0                /* convert A0 to byte address */
9:      A1=R5;                      /* mv2 */
10:         A1=A1+A1;               /* convert A0 to byte address */
11:     R0=*[((label1/2)+4)*2];     /* ldst0 */
12:     R1=*[A0];                   /* ldst4 */
13:     R2=*[A0+(4)*2];             /* ldst5 */
14:     R3=*[A0+A1];                /* ldst6 */
15:     R4=R4+R5;                   /* add0 */
16:     R5=R5+R3;                   /* add0 */
17:     R5=R5+*[((label1/2)+4)*2];  /* add1 */
18:     R4=A0;                      /* mv3 */
19          R4=R4>>1;               /* convert R4 to word address */
20:     R5=A1;                      /* mv3 */
21:         R5=R5>>1;               /* convert R5 to word address */
```

METHOD AND COMPUTER PROGRAM FOR CONVERTING AN ASSEMBLY LANGUAGE PROGRAM FOR ONE PROCESSOR TO ANOTHER

BACKGROUND OF THE INVENTION

1. Field of the Invention

The present invention relates to a method and computer program for converting an assembly language program for one processor so as to be implementable on another processor.

2. Description of Related Art

A processor (or microprocessor) is a computer which executes a program in order to produce a desired behavior. The program consists of a set of statements for implementing operations such as addition, subtraction, data-read from a memory connected to the processor, data-write to such a memory, etc. An instruction set varies from processor to processor, and hence, if an assembly language program described for one processor is to be implemented on another processor, it is necessary to convert the instruction descriptions for one processor to those implementable on another processor.

As is known in the art, the instruction (code) conversions are generally grouped into two: one is a conversion at a binary level and the other at a source level. The instruction conversion at the binary level is disclosed in the following documents (1) to (5), while the instruction conversion at the source code level is disclosed in the following documents (6) and (7).

The document (1) is a paper entitled "Dynamic Binary Translation and Optimization" by Kermal Ebcioglu, et al., IEEE Transactions on Computers, Vol. 50, No. 6, pp. 529-548, June 2001. The document (2) is a paper entitled "Open Source DAISY" available at IBM internet home page (http://oss.software.ibm.com/developerworks/opensource/daisy/). Each of the documents (1) and (2) is concerned with a translator named DAISY which is software for dynamically translating binary codes for the Intel x86 or IBM PowerPC to the IBM VLIW (Very Long Instruction Word) processor.

The document (3) is a paper entitled "FX132 A profile-Directed Binary Translator" by Anton Chernoff, et al., IEEE Micro, Vol. 18, No. 2, pp.56-64, March/April 1998. The document (3) describes the software named FX132 for converting the binary codes for the x86 architecture so as to be executed on the Alpha processor.

The document (4) is a technical report entitled "The Technology Behind Crusoe Processors" by Alexander Klaiber, et al., Transmeta Corporation, pp.1-18, January 2000. Although the processor Crusoe has an instruction set which is a different architecture of the Intel x86, the Crusoe is able to translate the instructions of the x86 to those of the Crusoe at a binary level.

The document (5) is a product data sheet entitled "Dynamite Dynamic Binary Translation" by Transitive Technologies Ltd., 2001, available at http://www.transives.com. According to this document, the binary codes for one processor are translated to the binary codes for another processor.

The document (6) is a paper entitled "Automatic Assembler Source Translation from the Z80 to the MC6809" by M. F. Smith, et al., IEEE Micro, Vol., No. 2, pp.3-9, April, 1984. This document describes a technology for converting Z80 code to MC6809 code using a Pascal program.

The document (7) is a paper entitled "TMS320C5x to TMS320C54x Translation Utility", Literature Number: BPRA075, published by Texas Instrument Europe, February 1998. This document describes the translation technology for converting the assembly source codes for the C5x of the Texas Instruments to the assembly codes which are executable on the C54x processor.

As is known in the art, there are two types of addressing schemes: one is byte addressing where a unique address is assigned to each byte of memory, and the other is word addressing where a unique address is assigned to more than one byte of memory.

Each of the above-mentioned documents (1) to (7) discloses technologies for converting the assembly language program having the same addressing scheme of byte addressing.

Up until now, however, no proposal has been made which converts the assembly language instructions (viz., assembly language program) with different addressing schemes (viz., byte addressing and word addressing). The reason for this may reside in the fact that it is difficult to effectively convert the address descriptions in the original program without sacrifice of the execution time on the target program, and that the code size of the converted program becomes undesirably lengthy.

SUMMARY OF THE INVENTION

It is therefore an object of the present invention to provide a method and computer program via which an assembly language program for one processor is converted so as to be implementable on another processor wherein the addressing schemes differ with the two processors.

In brief, these objects are achieved by the techniques for converting a first assembly language program implementable on a first processor to a second assembly language program implementable on another processor. The two assembly language programs are described using same instructions. A unique address in the first assembly language program is assigned to a first number of bytes, and a unique address in the second assembly language program is assigned to a second number of byte numbers. The first number is larger than the second number. The first assembly language program is read from a storage device. Thereafter, one or more address descriptions of the first assembly language program are translated to other one or more address descriptions using a ratio of the first number to the second number so that the first assembly language program is implementable on the second processor, wherein the ratio is 2 or a positive integer more than 2.

One aspect of the present invention resides in a method of converting a first assembly language program implementable on a first processor to a second assembly language program implementable on a second processor, the first and second assembly language programs being described using same instructions, a unique address in the first assembly language program being assigned to a first number of bytes, and a unique address in the second assembly language program being assigned to a second number of byte numbers, the first number being larger than the second number, comprising the steps of: reading the first assembly language program from a storage; and converting one or more address descriptions of the first assembly language program to another one or more address descriptions using a ratio of the first number to the second number so that the first assembly language program is implementable on the second processor, wherein the ratio is 2 or a positive integer more than 2.

Another aspect of the present invention resides in a method of converting a first assembly language program implementable on a first processor to a second assembly language program implementable on a second processor, the first and second assembly language programs being described using same instructions, a unique address in the first assembly language program being assigned to a first number of bytes, and a unique address in the second assembly language program being assigned to a second number of byte numbers, the first number being larger than the second number, comprising the steps of: (a) reading the first assembly language program from a storage; (b) searching the first assembly language program to find a character string which is automatically assigned an address by a software tool and does not indicate a branch destination, and if the character string is found, the character string is multiplied by 1/L where L is a ratio of the first number to the second number; and (c) searching the first assembly language program to find a first instruction for reading a value from a memory using an address described by a character string and/or a numerical value, and searching the first assembly language program to find a second instruction for writing a value to the memory using an address described by a character string and/or a numerical value, and if the first or second instruction is found, the character string and/or the numerical value contained in the first or second instruction is multiplied by L.

Still another aspect of the present invention resides in a method of converting a first assembly language program implementable on a first processor to a second assembly language program implementable on a second processor, the first and second assembly language programs being described using same instructions, a unique address in the first assembly language program being assigned to a first number of bytes, and a unique address in the second assembly language program being assigned to a second number of byte numbers, the first number being larger than the second number, comprising the steps of: (a) reading the first assembly language program from a storage; (b) searching the first assembly language program to find a character string which is automatically assigned an address by a software tool and does not indicate a branch destination, and if the character string is found, the character string is multiplied by 1/L where L is a ratio of the first number to the second number; (c) searching the first assembly language program to find a first instruction for reading a value from the memory using an address described by a character string and/or a numerical value, and searching the first assembly language program to find a second instruction for writing a value to the memory using an address described by a character string and/or a numerical value, and if the first or second instruction is found then the character string and/or the numerical value contained in the first or second instruction is multiplied by L; and (d) searching the first assembly language program to find a third instruction for transferring a value described by a character string and/or a numerical value to an address register, and if the third instruction is found, then the character string or the numerical value contained in the third instruction is multiplied by L.

Still another aspect of the present invention resides in a computer program product in a computer readable media for use in converting a first assembly language program implementable on a first processor to a second assembly language program implementable on a second processor, the first and second assembly language programs being described using same instructions, a unique address in the first assembly language program being assigned to a first number of bytes, and a unique address in the second assembly language program being assigned to a second number of byte numbers, the first number being larger than the second number, the computer program product comprising: instructions for reading the first assembly language program from a storage; and instructions for converting one or more address descriptions of the first assembly language program to another one or more address descriptions using a ratio of the first number to the second number so that the first assembly language program is converted to the second assembly language program so as to be implementable on the second processor, wherein the ratio is 2 or a positive integer more than 2.

Still another aspect of the present invention resides in a computer program product in a computer readable media for use in converting a first assembly language program implementable on a first processor to a second assembly language program implementable on a second processor, the first and second assembly language programs being described using same instructions, a unique address in the first assembly language program being assigned to a first number of bytes, and a unique address in the second assembly language program being assigned to a second number of byte numbers, the first number being larger than the second number, comprising: instructions for reading the first assembly language program from a storage; instructions for searching the first assembly language program to find a character string which is automatically assigned an address by a software tool and does not indicate a branch destination, and if the character string is found, the character string is multiplied by 1/L where L is a ratio of the first number to the second number; and instructions for searching the first assembly language program to find a first instruction for reading a value from a memory using an address described by a character string and/or a numerical value, and searching the first assembly language program to find a second instruction for writing a value to the memory using an address described by a character string and/or a numerical value, and if the first or second instruction is found, the character string and/or the numerical value contained in the first or second instruction is multiplied by L.

Still another aspect of the present invention resides in a computer program product in a computer readable media for use in converting a first assembly language program implementable on a first processor to a second assembly language program implementable on a second processor, the first and second assembly language programs being described using same instructions, a unique address in the first assembly language program being assigned to a first number of bytes, and a unique address in the second assembly language program being assigned to a second number of byte numbers, the first number being larger than the second number, comprising: instructions for reading the first assembly language program from a storage; instructions for searching the first assembly language program to find a character string which is automatically assigned an address by a software tool and does not indicate a branch destination, and if the character string is found, the character string is multiplied by 1/L where L is a ratio of the first number to the second number; instructions for searching the first assembly language program to find a first instruction for reading a value from the memory using an address described by a character string and/or a numerical value, and searching the first assembly language program to find a second instruction for writing a value to the memory using an address described by a character string and/or a numerical value, and if the first or second instruction is found then the character string and/or the numerical value contained in the first or second instruction is multiplied by L; and instructions for searching the first assembly language program to find a third instruction for transferring a value described by a character string and/or a numerical value to an address register, and if the third instruction is found, then the character string or the numerical value contained in the third instruction is multiplied by L.

BRIEF DESCRIPTION OF THE DRAWINGS

The features and advantages of the present invention will become more clearly appreciated from the following description taken in conjunction with the accompanying drawings in which like elements or portions are denoted by like reference numerals and in which:

FIG. 1 is a flow chart which shows the steps which characterize the operation according to a first embodiment of the present invention;

FIG. 2 is a diagram schematically showing general purpose registers and address registers, which are referred to when describing the operations embodying the present invention;

FIG. 3 shows reference symbols and examples of instructions both described in an original program for one processor to be converted to that for another processor according to the first embodiment of the present invention;

FIG. 4 shows an original program which is subject to conversion according to the first embodiment of the present invention;

FIGS. 5 and 6 show programs each of which is obtained during the conversion of the original program according to the first embodiment of the present invention;

FIG. 7 shows a program after the conversion of the original program is completed according to the first embodiment of the present invention;

FIG. 8 is a flow chart which shows the steps which characterize the operation according to a second embodiment of the present invention;

FIG. 9 shows reference symbols and examples of instructions both described in an original program for one processor which is converted according to the first embodiment of the present invention;

FIG. 10 shows an original program which is converted according to the second embodiment of the present invention;

FIG. 11 shows a program during the conversion of the original program according to the second embodiment of the present invention; and FIG. 12 shows a program after the conversion of the original program is completed according to the second embodiment of the present invention;

DETAILED DESCRIPTION OF THE PREFERRED EMBODIMENTS

In an assembly language program which is described so as to be implemented on a given processor, the addresses are generally classified into a base address and offset addresses. The base address is typically indicated by a character string (viz., a sequence of characters) and is used to denote a starting address of a predetermined memory space consisting of array elements (or cells). Each array element in the memory space is accessed using an offset address indicating an offset from the base address. The offset address is usually described using a character string and/or a numerical value. Hereinafter, the offset address is referred to simply as an address.

As mentioned above, an addressing scheme where more than one byte of memory has a unique address is called "word addressing", while an addressing scheme where each byte of memory has a unique address is "byte addressing". In the instant disclosure, a word addressing type processor is referred to as a processor W, and a byte addressing type processor is referred to as a processor B for the convenience of description.

In an assembly language program which is described to be implemented on the processor W, a software tool such as a linker automatically assigns a character string to a word address. Likewise, in an assembly language program described for the processor B, a software tool automatically assigns a character string to a byte address.

It is assumed that the architectures of the processors W and B are identical except the addressing schemes, and hence the instructions of the processors W and B are also identical with each other. In this case, if the program described for the processor W is implemented on the processor B without any conversion, only a character string which is automatically assigned an address by the linker has a byte address, and the remaining numerical values or character strings, each of which is not automatically assigned an address, has a word address. Accordingly, in order that the program described for the processor W is successfully implemented on the processor B, it is necessary to change the address descriptions in the program described for the processor W.

The following discussion focuses on converting the program described for the processor W to that implementable on the processor B under the above-mentioned assumptions. A ratio of the number of bytes assigned to a unique address in the program for the processor W to the number of bytes (viz., a single byte) assigned to a unique address in the program for the processor B is denoted by L.

As is known, it is typical that an address is indicated by the sum of two or more addresses described by a character string(s) and/or a numerical value(s). Designating the symbol character string and the numerical value by "label" and "K" respectively, an address is usually indicated by [label+K] by way of example. In this case, "K" may also represent a symbol character.

A first embodiment of the present invention will be described with reference to FIGS. 1 to 7.

FIG. 1 is a flow chart which shows the steps which characterize the operation of the first embodiment via which an original program described for the processor W is converted to that implementable on the processor B. An appropriate storage 10 such as a floppy-disk, hard disk, etc. is provided for storing the program conversion software according to the first embodiment and the original program to be converted. When the original program conversion is to be initiated, the conversion program and the original program are loaded from the storage 10 into a computer 12. As shown in FIG. 1, the program conversion according to the first embodiment is generally divided into four steps 14, 16, 18 and 20.

At step 14, if a character string to which an address is assigned in the original program matches predetermined conditions, the character string is multiplied by 1/L where, as mentioned above, L is a ratio of byte numbers assigned to a unique address in the original processor W to byte numbers assigned to a unique address in a target processor (viz., the processor B). More specifically, at step 14, the conversion program searches the original program to find a character string which is automatically assigned an address by a software tool such as a linker and does not indicate a branch destination. If the character string is found, the character string is multiplied by 1/L.

In order to explain the operations at steps 16 and 18, it is necessary to define the architecture which is common to the two processors W and B. It is assumed that each of the processors W and B is provided with general purpose registers Rn (n=0 to (N−1)) and address registers Am (m=0 to (M−1)), as schematically shown in FIG. 2. As is known in the art, each of the general purpose registers Rn is used by a processor for temporarily storing data or computation results, or sometimes is used for storing addresses of a memory operatively coupled to the processor. On the other hand, each of the address registers Am is dedicated to storing addresses.

It is further assumed that the address, which is used by the processor when data is read from the memory and written thereinto, is described by a character string and/or a numerical value. In order to simplify the description, when the contents of a register Am or Rn is multiplied, it may be expressed simply by "multiply Am" or "multiply Rn" by way of example. That is to say, the expression of the contents of the register may occasionally be omitted.

The operations at steps 16 and 18 are implemented under the following rules 1 and 2.

Rule 1

When a value is read from the memory or written thereinto, if all or part of the address of the memory is described by a character string and/or a numerical value, the character string and/or the numerical value is multiplied by L.

Rule 2

If all or part of the address is stored in a general purpose register Rn, an instruction for multiplying Rn by L is inserted so as to be implemented during the execution cycle preceding the cycle in which the original address is implemented, and an instruction for multiplying the general purpose register Rn by 1/L is inserted so as to be implemented during the execution cycle immediately after the cycle in which the original address is implemented.

The Rules 1 and 2 will be discussed in more detail with reference to instructions shown in FIG. 3, which are common to both the processors W and B. It is to be noted that the instructions shown in FIG. 3 are exemplary in that, as is known in the art, the assembly language instructions are different from processor to processor.

In FIG. 3, a plurality of symbols such as LDST0, LDST2, etc. listed in the left column are described in comments in the original program and referred to by the program converter. Further, in FIG. 3, the instructions are exemplified at the right column, which instructions are respectively related to the corresponding symbols at the left column and referred to using the symbols by the program converter so as to be converted if necessary.

The conversion of the original instructions will be described below with reference to Rules 1 and 2.

<<Conversion of Instruction referred to using the symbol "LDST0">>

The instruction referred to using "LDST0" is for reading data from an address described by a character string and/or a numerical value, or for writing data into such an address. In this case, Rule 1 is applied to this instruction, and accordingly, the character string and/or the numerical value is multiplied by L. For example, $R0=*[label+K]$ is converted to $R0=*[(label+K)*L]$ where "label" is a character string to which an address is automatically assigned by software such as a linker, and K represents a symbol character or a numerical value such as a constant.

<<Conversion of Instruction referred to using the symbol "LDST1">>

The instruction referred to using "LDST1" is used to read data from an address indicated by a general purpose register, or used to write data into such an address. In this case, Rule 2 is applied to this instruction. Thus, an instruction for multiplying the general purpose register storing all or part of the address by L is inserted in the execution cycle preceding the cycle in which the original instruction is implemented. In addition, an instruction for multiplying the general purpose register storing all or part of the address by 1/L is inserted in the execution cycle immediately after the cycle in which the original instruction is implemented. For example, if L=2, $R0=*[R4]$ is converted to the following three instructions $R4=R4+R4$ $R0=*[R4]$ $R4=R4>>1$ The add instruction $R4=R4+R4$ for doubling the contents of R4 can be replaced by a left shift instruction $R4=R4<<1$, which is also applicable to the following discussion.

<<Conversion of Instruction referred to using the symbol "LDST2">>

The instruction referred to using "LDST2" is used to read data from an address which is the sum of two addresses: one is described by a character string and/or a numerical value and the other is the contents of a general purpose register, or also used to write data into such an address. In this case, Rules 1 and 2 are applied to converting this instruction. That is, the instruction related to "LDST2" is converted such that a character string and/or a numerical value, which forms part or all of an address, are multiplied by L. Further, an instruction for multiplying the general purpose register storing all or part of the address by L is inserted so as to be implemented during an execution cycle preceding the cycle in which the original instruction is implemented. In addition, an instruction for multiplying the general purpose register storing all or part of the address by 1/L is inserted so as to be implemented during the execution cycle immediately after the cycle in which the original instruction is implemented. For example, if L=2 then $R0=*[R4+K]$ is converted to the following three instructions $R4=R4+R4$ $R0=*[R4+(K)*2]$ $R4=R4>>1$ <<Conversion of Instruction referred to using the symbol "LDST3">>

The instruction referred to using "LDST3" is used to read data from an address which is the sum of two general purpose registers, or write data into such an address. In this case, Rule 2 is applied to the conversion of this instruction. That is, two instructions for respectively multiplying the general purpose registers each storing all or part of the address by L are inserted so as to be implemented during the execution cycles preceding the cycle in which the original instruction is implemented. In addition, two instructions for respectively multiplying the general purpose registers each storing all or part of the address by 1/L are inserted so as to be implemented during the execution cycles immediately after the cycle in which the original instruction is implemented. For example, if L=2 then $R0=*[R4+R5]$ is converted to the following five instructions $R4=R4+R4$ $R5=R5+R5$ $R0=*[R4+R5]$ $R4=R4>>1$ $R5=R5>>1$ <<Conversion of Instruction referred to using the symbol "ADD1">>

The instruction referred to using "ADD1" is used to add a value stored in a general purpose register and a value read from the memory and then store the sum in the general purpose register. In this case, if all or part of the address of the memory, from which the data is to be retrieved, is described by a character string and/or a numerical value, then the character sting and/or a numerical value are multiplied by L. As an alternative, in the case where all or part of the address is loaded to a general purpose register, an instruction for multiplying the address stored in the general purpose register by L is inserted so as to be implemented during an execution cycle preceding the cycle where the instruction is implemented, and in this case, further, an instruction for multiplying the address stored in the general purpose registers by 1/L is inserted so as to be implemented during the execution cycle immediately after the cycle where the original instruction is implemented. When the instruction related to the symbol "ADD1" is implemented using an address described by a character string and/or a numerical value, Rule 1 is applied to such a case. For example, if L=2, then $R0=R0+*[label+K]$ is converted to the following $R0=R0+*[(label+K)*2]$ On the other hand, in the case where the address is stored in the general purpose register R4 when implementing the instruction related to the symbol "ADD1", Rule 2 is used. For example, in this case, the conversion is implemented as follows (assuming L=2), $R0=R0+*[R4]$ is converted to the following three instructions $R4=R4+R4$ $R0=R0+*[R4]$ $R4=R4>>1$ Further, if the address in the instruction referred to using the symbol ADD1 is represented by the sum of the general purpose register R4 and the symbol character K, Rule 1 is applied thereto. For example, when assuming L=2, $R0=R0+*[R4+K]$ is converted to the following three instructions $R4=R4+R4$ $R0=R0+*[R4+(K)*2]$ $R4=R4>>1$ Still further, if the address in the instruction related to the symbol ADD1 is represented by the sum of the general purpose registers R4 and R5, then Rule 2 is applied thereto. For example, when assuming L=2, $R0=R0+*[R4+R5]$ is converted to the following five instructions $R4=R4+R4$ $R5=R5+R5$ $R0=R0+*[R4+R5]$ $R4=R4>>1$ $R5=R5>>1$ FIG. 3 does not list the other instructions such as subtraction, multiplication, division, shift, logical operation, etc. However, if each of these instructions involves an instruction which accompanies data-read from the memory or data-write thereinto, the address description in such an instruction is converted as mentioned above.

Rules 1 and 2 are not applied to the instructions related to the symbols such as MV0, ADD0, and SHIFT0, and hence these instructions remain unchanged during the program conversion in question.

The above-mentioned conversions of instruction descriptions are implemented at steps 16 and 18. At step 16, as shown in FIG. 1, a symbol character string and/or a numerical value, which indicates an address for data-read or data-write with respect to the memory, is multiplied by L. More specifically, at step 16, the conversion program according to the first embodiment searches the assembly language program, which has been processed at step 14, to find a first instruction for reading a value from the memory using an address described by a character string and/or a numerical value, and further searches the assembly language program, which has been processed at step 14, to find a second instruction for writing a value to the memory using an address described by a character string and/or a numerical value, and if the first or second instruction is found, the character string and/or the numerical value contained in the first or second instruction is multiplied by L.

On the other hand, at step 18, as shown in FIG. 1, if there is an instruction for reading or writing a value using an address stored in a general purpose register with respect to the memory, new instructions for multiplying the contents of registers by L or 1/L are inserted into the original assembly language program. In more specific term, at step 18, the conversion program according to the first embodiment of the present invention searches the assembly language program, which has been processed at step 14, to find a third instruction for reading a value from the memory using an address stored in a general purpose register, and further searches the original assembly language program, which has been processed at step 14, to find a fourth instruction for writing a value to the memory using an address stored in a general purpose register, and if the third or fourth instruction is found, an instruction for multiplying the contents of the general purpose register by L is inserted so as to be implemented during an execution cycle preceding the cycle in which the third or fourth instruction is implemented, and further, an instruction for multiplying the contents of the general purpose register by 1/L is inserted so as to be implemented during an execution cycle immediately after the cycle in which the third or fourth instruction is executed.

At step 20, a redundant instructions inserted at step 18 is deleted, which will be described later in detail.

One concrete example of the first embodiment of the present invention will be described. As mentioned above, the architectures of the processors W and B are assumed to be identical except the addressing schemes (viz., word and byte addressing respectively). That is, the assembly language instructions of the processors W and B are identical with each other. Under such assumption, the assembly language program described for the processor W is converted so as to be implementable on the processor B.

FIG. 4 shows an original assembly language program which is described for the processor W and is subject to the program conversion. A single instruction is described in one line, and the end of the instruction is terminated by a semicolon ";". A description between /* and */ is a comment wherein the symbols shown in FIG. 3 are described and referred to by the program converter. In FIG. 4, the character string "label1" is a label indicative of an address in the memory, and the actual address thereof is automatically assigned by another software tool such as a linker when implemented on the processors W and B. It is assumed L=2 in the following description.

Since the character string "label1" is only automatically assigned an address by the linker in this particular case, the character string "label1" is converted to "label1/2" at step 14, leaving the other instruction descriptions unchanged.

FIG. 5 shows the original assembly language program which has been processed at step 14.

FIG. 6 shows the program which has been processed at steps 16 and 18, and in FIG. 6, the instructions inserted at step 16 are indented. For a better understanding of the instant embodiment, the operation performed at steps 16 and 18 on the program processed at step 14 will be described.

(1) No conversion is carried out on the transfer instructions "mv0" and "mv1".

(2) Regarding the instruction referred to using the symbol "ldst0", the character string (=label) and a numerical value (=4) is multiplied by 2 (=L) (Line 5).

(3) Regarding the load instruction referred to using the symbol "ldst1", an instruction for multiplying the register R4 by 2 is inserted immediately before the instruction associated with "load1" (Line 6), and an instruction for multiplying R4 by ½ is inserted immediately after the instruction associated with "load1" (Line 8).

(4) Regarding the load instruction referred to using the symbol "ldst2", an instruction for multiplying the register R4 storing the address by 2 is inserted immediately before the load instruction associated with "ldst2" (Line 9), and an instruction for multiplying the register R4 by ½ is inserted immediately after the instruction related to "ldst2" (Line 11). Further, the numerical value 4 (corresponding to K) is multiplied by 2 (Line 10).

(5) Regarding the load instruction referred to using "ldst3", two instructions for respectively doubling the registers R4 and R5 each of which stores the address, are inserted immediately before the load instruction associated with "load3" (Lines 12 and 13), and two instructions for respectively multiplying the registers R4 and R5 by ½ are inserted immediately after the load instruction associated with "ldst3" (Lines 15 and 16).

No conversion is implemented on the add instructions related to "add0" and "add1".

Subsequently, the redundant instruction(s) inserted at step 18 is removed at step 20. It is understood that some instructions, which have been inserted when converting add and shift instructions, are unnecessary. As seen from FIG. 6, the add instruction "R4=R4+R4" (Line 9) is inserted immediately after the shift instruction "R4=R4>>1" (Line 8). However, the least significant bit of the register R4 has been made zero by the add instruction "R4=R4+R4" (Line 6), and accordingly, in case the above-mentioned two instructions be executed, the contents of the register R4 remains unchanged. Thus, the two instructions inserted at Lines 8 and 9 are meaningless or redundant. The same discussion is applicable to the shift instruction "R4=R4>>1" (Line 11) and the add instruction "R4=R4+R4" (Line 12). These redundant instructions are removed at step 20. The converted program after removing the redundant instructions is shown in FIG. 7.

A second embodiment of the present invention will be described with reference to FIGS. 8 to 12.

FIG. 8 is a flow chart which shows the steps which characterize the second embodiment via which an original program described for the processor W is converted so as to be implementable on the processor B. As in the first embodiment, the program conversion software according to the second embodiment is stored in the storage 10 of FIG. 1, and the original program to be converted is also stored in the same storage 10 by way of example. As shown in FIG. 8, the program conversion according to the second embodiment is generally comprised of steps 24, 26, 28, 30, 32, and 34. Step 24 is identical to step 14 (FIG. 1), and as such, the description of step 24 will be omitted for brevity.

As in the first embodiment, in order to explain the operations at steps 26, 28, 30, and 32, it is necessary to define the architecture including the instructions which are common to the processors W and B, and registers used thereby. The assumptions, which have been made before referring to Rules 1 and 2 with respect to the first embodiment, apply to the second embodiment.

The operations at steps 26, 28, 30, and 32 are implemented according to the following Rules 3 to 6.

Rule 3

When a value is read from the memory or written thereinto, if all or part of the address of the memory is described by a character string and/or a numerical value, the string and/or the numerical value is multiplied by L.

Rule 4

As to an instruction for transferring a value to an address register Am, if all or part of the value (viz., address) to be transferred is described by a character string and/or a numerical value, the character string and/or the numerical value is multiplied by L.

Rule 5

As to an instruction for transferring a value to an address register Am, if all or part of the value (viz., address) to be transferred is stored in a memory space other than the address registers, an instruction for multiplying the contents of the address register Am by L is inserted so as to be implemented during the execution cycle immediately after the cycle wherein the original transfer instruction is implemented. As an alternative, if all or part of the address to be transferred is stored in a memory space other than the address registers, an instruction for multiplying the address stored in the memory space by L is inserted so as to be implemented during the execution cycle preceding the cycle wherein the original transfer instruction is implemented, and in addition, an instruction for multiplying the address stored in the memory space by 1/L is inserted so as to be implemented during the execution cycle immediately after the cycle wherein the original transfer instruction is implemented.

Rule 6

As to an instruction for transferring a value stored in an address register Am to a memory space other than the address registers, if all or part of the address is stored in the address register Am, an instruction for multiplying the transferred address by 1/L is inserted so as to be implemented during the execution cycle immediately after the cycle wherein the original transfer instruction is implemented. As an alternative, if all or part of the address is stored in an address register Am, an instruction for multiplying the address stored in the address register Am by 1/L inserted so as to be implemented during the execution cycle preceding the cycle wherein the original transfer instruction is implemented, and further, an instruction for multiplying the address stored in the address register Am by L is inserted so as to be implemented during the execution cycle immediately after the cycle wherein the original transfer instruction is implemented.

The above-mentioned Rules 3 to 6 will further be described with reference to the examples of instructions shown in FIG. 9 which corresponds to FIG. 3. As in the first embodiment, the symbols are described in comments in the original program and referred to by the program converter in order to convert the instructions related to the symbols. Further, as mentioned above, the descriptions of assembly language instructions vary from processor to processor, and thus, the instructions shown in FIG. 9 are exemplary. Instructions related to the symbols "LDST4", "LDST6", "MV0", "ADD0", "ADD2", and "SHFT0", which are listed in FIG. 9 but not described above, correspond to none of Rules 3 to 6, and thus they are not subject to any conversion during the program translation.

<<Conversion of Instruction referred to using the symbol "LDST0">>

The instruction referred to using "LDST0" is an instruction for reading data from the memory at an address which is described by a character string and/or a numerical value, or an instruction for writing data into such an address. In this case, Rule 3 is applied to this instruction, and accordingly, the symbol character sequence and/or the numerical value is multiplied by L. For example, if L=2, $R0=*[label+K]$ is converted to $R0=*[(label+K)*2]$ <<Conversion of Instruction referred to using the symbol "LDST4">>

The instruction referred to using "LDST4" is not converted.

<<Conversion of Instruction referred to using the symbol "LDST5">>

The instruction referred to using "LDST2" is an instruction for reading data from an address which is the sum of two addresses: one is described by a character string and/or a numerical value and the other is stored in an address register, or an instruction for writing data into such an address. In this case, Rule 3 is applied to the conversion of this instruction. The address stored in the address register has been converted to a byte address at the time when being transferred to the address register, as will be described in connection with the symbol "MV1" in the following, and as such, only the character string and/or the numerical value is multiplied by L. For example, if L=2, $R0=*[A0+K]$ is converted to $R0=*[A0+(K)*2]$ <<Conversion of Instruction referred to using the symbol "MV1">>

The instruction referred to using the symbol "MV1" is an instruction for transferring a value described by a character string and/or a value to the address register. In this instance, Rule 4 is applied to the conversion of this instruction. That is, this instruction is converted such that the address register stores the value multiplied by L. For example, in the case of L=2,

A0=K is converted to $A0=(K)*2$

<<Conversion of Instruction referred to using a symbol "MV2">>

The instruction referred to using the symbol "MV2" is an instruction for transferring a value stored in a general purpose register to an address register, and, thus, Rule 5 is applied to the conversion of this instruction. In this case, the instruction is converted such that the address register stores L times the value stored in the general purpose register. For example, in the case of L=2,

A0=R0 is converted to the following two instructions

A0=R0

$A0=A0+A0$

As an alternative,

A0=R0 is converted to the following three instructions $R0=R0+R0$

A0=R0

$R0=R0>>1$

<<Conversion of instruction referred to using the symbol "MV3">>

The instruction referred to using "MV3" is an instruction for transferring a value stored in the address register to a general purpose register, and thus, Rule 6 is applied to the conversion of this instruction. In this case, the instruction is converted such that the general purpose register stores 1/L times the value stored in the address register.

For example, in the case of L=2,

R0=A0 is converted to the following two instructions

R0=A0

$R0=R0>>1$

As an alternative, $$R0=A0$$

is converted to the following three instructions $$A0=A0>>1$$

$$R0=A0$$

$$A0=A0+A0$$

<<Conversion of Instruction referred to using the symbol "MV4">>

The instruction referred to using "MV4" is an instruction for moving a value (viz., address) from the memory to an address register. In this case, if all or part of the address is described by a character string and/or a numerical value, the character string and/or the numerical value is multiplied by L (Rule 3), and subsequently the value in the address register is multiplied by L (Rule 5).

For example, in the case of L=2, $$A0=*[label+K]$$

is converted to the following two instructions $$A0=*[(label+K)*2]$$

$$A0=A0+A0$$

On the other hand, when a value is read from the memory using an address stored in the address register, Rule 5 is applied to this case. For example, in the case of L=2, $$A0=*[A1]$$

is converted to the following two instructions $$A0=*[A1]$$

$$A0=A0+A0$$

Further, if a value is read from the memory using an address which is the sum of an address stored in the address register and an address described by a character string and/or a numerical value, the original instruction is converted using Rules 3 and 5. For example, in the case of L=2, $$A0=*[A1+K]$$

is converted to the following two instructions $$A0=*[A1+(K)*2]$$

$$A0=A0+A0$$

<<Conversion of Instruction referred to using the symbol "MV5">>

The instruction referred to using "MV5" is an instruction for transferring a value stored in an address register to the memory. In this case, the value stored in the address register is multiplied by 1/L, after which the multiplied value in the address register has been moved to the memory. Further, an instruction for multiplying the value stored in the address register by L is inserted after the multiplied value in the address register is moved to the memory. In this instance, if all or part of the address of the memory is described by a character string and/or a numerical value, then they are multiplied by L. The conversion is implemented using Rules 3 and 6. For example, assuming L=2, $$*[label1+K]=A0$$

is converted to the following three instructions $$A0=A0>>1$$

$$*[(label1+K)*2]=A0$$

$$A0=A0+A0$$

On the other hand, if a value is transferred to the memory using an address stored in an address register, Rule 6 applies in this case. For example, assuming L=2, $$*[A1]=A0$$

is converted to the following three instructions $$A0=A0>>1$$

$$*[A1]=A0$$

$$A0=A0+A0$$

Further, if a value is transferred to the memory using an address which is the sum of an address stored in an address register and an address described by a character string and/or a numerical value, the original instruction is converted using Rules 3 and 6. For example, in the case of L=2, $$*[A1+K]=A0$$

is converted to the following three instructions $$A0=A0>>1$$

$$*[A1+(K)*2]=A0$$

$$A0=A0+A0$$

<<Conversion of Instruction referred to using the symbol "ADD1">>

The instruction referred to using "ADD1" is an instruction for adding a value stored in a general purpose register and a value read from the memory, and then transferring the sum to the general purpose register, in the case of which Rule 3 applies. If all or part of the address of the memory is described by a character string and/or a numerical value, then they are multiplied by L. For example, assuming L=2, $$R0=R0+*[label+K]$$

is converted to $$R0=R0+*[(lable+K)*2]$$

On the other hand, when an address is represented by the sum of an address of the address register A0 and the symbol character K, the following translation is implemented. That is, if L=2, $$R0=R0+*[A0+K]$$

is converted to $$R0=R0+*[A0+(K)*2]$$

FIG. 9 does not list the instructions for subtraction, multiplication, division, shift, and logical operation. If any one of these instructions includes an instruction such as to read data from the memory or write data thereinto, the address appearing in such an instruction is converted as mentioned above.

The above-mentioned conversions of instruction descriptions are implemented at steps 26, 28, 30, and 32 of FIG. 8. At step 26, as shown in FIG. 8, if there is an instruction, in the program having been processed at step 24, for reading or writing a value with respect to the memory using an address described by a character string and/or a numerical value, the character string and/or a numerical value is multiplied by L.

More specifically, at step 26, the conversion program according to the second embodiment of the present invention searches the program having been processed at step 24 to find a first instruction for reading a value from the memory using an address described by a character string and/or a numerical value, and searching the program having been processed at step 24 to find a second instruction for writing a value to the memory using an address described by a character string and/or a numerical value, and if the first or second instruction is found then the character string and/or the numerical value contained in the first or second instruction is multiplied by L.

At step 28, as shown in FIG. 8, if there is an instruction, in the program having been processed at step 24, for moving a value described by a character string and/or a numerical value to an address register, the character string and/or the numerical value is multiplied by L.

To describe in more detail, the conversion program according to the second embodiment searches the program having been processed at step 24 to find a third instruction for transferring a value described by a character string and/or a numerical value to an address register, and if the third instruction is found, then the character string or the numerical value contained in the third instruction is multiplied by L.

At step 30, as shown in FIG. 8, if there is an instruction, in the program having been processed at step 24, for transferring a value stored in a non-address-register to an address register, a new instruction for multiplying the value stored in the address register by L is inserted, or two new instructions are inserted: one is for multiplying the value to be transferred by L, and the other for multiplying the value to be transferred by 1/L.

In more specific term, at step 30, the conversion program according to the second embodiment searches the program having been processed at step 24 to find a fourth instruction for transferring a value stored in a memory space other than address registers to an address register, and if the fourth instruction is found then an instruction for multiplying the value stored in the address register by L is inserted so as to be implemented during an execution cycle immediately after the cycle in which the fourth instruction is executed. As an alternative, if the aforesaid fourth instruction is found, an instruction for multiplying the value to be transferred by L is inserted so as to be implemented during an execution cycle preceding the cycle in which the fourth is implemented, and further an instruction for multiplying the value to be transferred by 1/L is inserted so as to be implemented during an execution cycle immediately after the cycle in which the fourth instruction is implemented.

At step 32, as shown in FIG. 8, if there is an instruction for transferring a value stored in an address register to a non-address-register, a new instruction for multiplying the value stored in the non-address-register 1/L is inserted, or two new instructions are inserted: one is for multiplying the value to be transferred by 1/L and the other for multiplying the value to be transferred by L.

More specifically, at step 32, the conversion program according to the second embodiment searches the program having been processed at step 24 to find a fifth instruction for transferring a value stored in an address register to a memory space other than the address registers, and if the fifth instruction is found then an instruction for multiplying the value stored in the memory space other than the address registers by 1/L is inserted so as to be implemented during an execution cycle immediately after the cycle in which the fifth instruction is executed. As an alternative, if the aforesaid fifth instruction is found, an instruction for multiplying the value to be stored in the address register by 1/L is inserted so as to be implemented during an execution cycle preceding the cycle in which the fifth instruction is implemented, and further, an instruction for multiplying the value stored in the address register by L is inserted so as to be implemented during an execution cycle immediately after the cycle in which the fifth instruction is implemented.

At step 34, if there is a redundant instruction(s) inserted at steps 30 and 32 the redundant instruction(s) is deleted. The operation at step 34 is identical to that at step 20, and accordingly the further description thereof will be omitted for simplifying the instant disclosure.

One concrete example of the second embodiment of the present invention will be described. As in the first embodiment, the architectures of the processors W and B are assumed to be identical except the addressing schemes (viz., word and byte addressing respectively). That is, the assembly language instructions of the processors W and B are identical with each other. Under such assumptions, the assembly language program described for the processor W is converted so as to be implementable on the processor B.

FIG. 10 shows an original assembly language program which is described for the processor W and is subject to the program conversion according to the second embodiment. As mentioned in connection with FIG. 4, a single instruction is described in one line, and the end of the instruction is terminated by a semicolon ";". A description between /* and */ is a comment wherein the symbols shown in FIG. 9 are described and referred to by the program converter. In FIG. 10, the character string "label1" is a label indicative of an address in the memory, and the actual address thereof is automatically assigned by another software tool such as a linker when implemented on the processors W and B. It is assumed L=2 in the following description.

Since the character string "label1" is only automatically assigned an address by the linker in this particular case, the character string "label1" is converted to "label1/2" at step 24, leaving the other instruction descriptions unchanged.

FIG. 11 shows the original assembly language program which has been processed at step 24.

The program, which has been processed at steps 26, 28, 30, and 32, contains no redundant instruction and hence is the final program (viz., converted program) which is shown in FIG. 12.

The conversion processes performed at steps 26, 28, 30, and 32 will be described with reference to FIG. 12. In FIG. 12, the instructions inserted at steps 30 and 32 are indented to distinguish them from the non-inserted instructions. Since the conversion of the instruction descriptions per se has been described in detail, it is deemed easy to understand the operation performed at steps 26, 28, 30, and 32, and accordingly only a brief description thereof will be given for brevity. In the following, it is assumed L=2.

(1) No conversion is carried out on the transfer instruction referred to using "mv0".

(2) Regarding the transfer instruction referred to using "mv1", a value transferred to the address register is multiplied by 2 (=L).

(3) Regarding the transfer instruction referred to using "mv2", an instruction for multiplying the address register by 2 is inserted immediately after the original instruction.

(4) Regarding the load instruction referred to using the symbol "ldst0", a character string and/or a numerical value is multiplied by 2.

(5) No conversion is carried out on the load instruction referred to using "ldst4".

(6) Regarding the load instruction referred to using the symbol "ldst5", a character string and/or a numerical value indicating an address is multiplied by 2.

(7) No conversion is carried out on the transfer instruction referred to using "ldst6".

(8) No conversion is carried out on the add instruction referred to using "add0".

(9) Regarding the add instruction referred to using "add1", a character string and/or a numerical value is multiplied by 2.

(10) Regarding the transfer instruction referred to using "mv3", an instruction for multiplying the address register by ½ is inserted immediately after the original instruction.

A file format of the original program has not been explained in the above. However, the application of the present invention is independent of the file format (binary file or text file). By way of example, in the case where an original program to be converted is a binary file, the character strings are represented by binary codes. In this case, the binary codes are converted according to the present invention, after which the converted program can be processed so as to be derived as a binary file or a text file using a conventional technique.

The program conversion embodying the present invention can be implemented statically or dynamically. That is to say, it is possible to previously convert the original program and thereafter implement the converted program, and as an alternative, the conversion of the original program can be carried out concurrently with the implementation of the converted program.

When the converted programs shown in FIGS. 7 and 12 are implemented on the processor B, an actual address assigned to the character string such as "label1" should be a multiple of L.

The first and second embodiments of the present invention have so far been described in connection with the case where one processor is of the word addressing type and the other of the byte addressing type. However, it is within the scope of the present invention to apply the invention to the case where the two processors both operate under the word addressing scheme.

Further, the present invention is also applicable to the case where both the addressing schemes and the instructions are different with the two processors such as W and B.

The foregoing descriptions show two preferred embodiments. However, other various modifications are apparent to those skilled in the art without departing from the scope of the present invention which is only limited by the appended claims. Therefore, the embodiments and modification shown and described are only illustrated, not restrictive.

What is claimed is:

1. A method of converting a first assembly program implementable on a first processor to a second assembly program implementable on a second processor, the first and second assembly programs being described using same instructions, a unique address in the first assembly program being assigned to a plurality of bytes, and a unique address in the second assembly program being assigned to a single byte, comprising the steps of:

(a) reading the first assembly program from a storage;

(b) searching the first assembly program to find a character string which is automatically assigned an address by a software tool and does not indicate a branch destination, and if the character string is found, the character string is multiplied by 1/L where L is a number of the plurality of bytes; and (c) searching the first assembly program to find a first instruction for reading a value from a memory using an address described by a character string and/or a numerical value, and searching the first assembly program to find a second instruction for writing a value to the memory using an address described by a character string and/or a numerical value, and if the first or second instruction is found, the character string and/or the numerical value contained in the first or second instruction is multiplied by L.

2. A method of converting a first assembly program implementable on a first processor to a second assembly program implementable on a second processor, the first and second assembly programs being described using same instructions, a unique address in the first assembly program being assigned to a plurality of bytes, and a unique address in the second assembly program being assigned to a single byte, comprising the steps of:

(a) reading the first assembly program from a storage;

(b) searching the first assembly program to find a character string which is automatically assigned an address by a software tool and does not indicate a branch destination, and if the character string is found, the character string is multiplied by 1/L where L is a number of the plurality of bytes;

(c) searching the first assembly program to find a first instruction for reading a value from the memory using an address described by a character string and/or a numerical value, and searching the first assembly program to find a second instruction for writing a value to the memory using an address described by a character string and/or a numerical value, and if the first or second instruction is found then the character string and/or the numerical value contained in the first or second instruction is multiplied by L; and (d) searching the first assembly program to find a third instruction for transferring a value described by a character string and/or a numerical value to an address register, and if the third instruction is found, then the character string or the numerical value contained in the third instruction is multiplied by L.

3. A computer program product in a computer readable media for use in converting a first assembly program implementable on a first processor to a second assembly program implementable on a second processor, the first and second assembly programs being described using same instructions, a unique address in the first assembly program being assigned to a plurality of bytes, and a unique address in the second assembly program being assigned to a single byte, comprising:

instructions for reading the first assembly program from a storage;

instructions for searching the first assembly program to find a character string which is automatically assigned an address by a software tool and does not indicate a branch destination, and if the character string is found, the character string is multiplied by 1/L where L is a number of the plurality of bytes; and instructions for searching the first assembly program to find a first instruction for reading a value from a memory using an address described by a character string and/or a numerical value, and searching the first assembly program to find a second instruction for writing a value to the memory using an address described by a character string and/or a numerical value, and if the first or second instruction is found, the character string and/or the numerical value contained in the first or second instruction is multiplied by L.

4. A computer program product in a computer readable media for use in converting a first assembly program implementable on a first processor to a second assembly program implementable on a second processor, the first and second assembly programs being described using same instructions, a unique address in the first assembly program being assigned to a first number of bytes, and a unique address in the second assembly program being assigned to a single byte, comprising:

instructions for reading the first assembly program from a storage;

instructions for searching the first assembly program to find a character string which is automatically assigned an address by a software tool and does not indicate a branch destination, and if the character string is found, the character string is multiplied by 1/L where L is a number of the plurality of bytes;

instructions for searching the first assembly program to find a first instruction for reading a value from the memory using an address described by a character string and/or a numerical value, and searching the first assembly program to find a second instruction for writing a value to the memory using an address described by a character string and/or a numerical value, and if the first or second instruction is found then the character string and/or the numerical value contained in the first or second instruction is multiplied by L; and instructions for searching the first assembly program to find a third instruction for transferring a value described by a character string and/or a numerical value to an address register, and if the third instruction is found, then the character string or the numerical value contained in the third instruction is multiplied by L.

* * * * *